(12) United States Patent
Reese, II et al.

(10) Patent No.: US 6,491,846 B1
(45) Date of Patent: Dec. 10, 2002

(54) PROCESS FOR THE IN-SITU PRODUCTION OF POLYOL BLENDS, THE IN-SITU PRODUCED POLYOL BLENDS, AND THEIR USE IN THE PRODUCTION OF VISCOELASTIC FOAM

(75) Inventors: Jack R. Reese, II, Dormagen (DE); Stanley L. Hager, Cross Lanes, WV (US)

(73) Assignee: Bayer Antwerpen, N.V., Antwerp (BE)

( * ) Notice: Subject to any disclaimer, the term of this patent is extended or adjusted under 35 U.S.C. 154(b) by 0 days.

(21) Appl. No.: 09/886,510

(22) Filed: Jun. 21, 2001

(51) Int. Cl.⁷ .............................................. C08G 18/14
(52) U.S. Cl. .......................... 252/182.27; 252/182.24; 521/170; 521/174
(58) Field of Search ................................ 521/170, 174; 252/182.24, 182.27

(56) References Cited

U.S. PATENT DOCUMENTS

| | | | |
|---|---|---|---|
| 3,404,109 A | 10/1968 | Milgrom | 260/611 |
| 4,950,695 A | 8/1990 | Stone | 521/157 |
| 4,981,880 A * | 1/1991 | Lehmann et al. | 521/118 |
| 5,114,619 A | 5/1992 | Heuvelsland | 252/182.27 |
| 5,470,813 A | 11/1995 | Le-Khac | 502/175 |
| 5,689,012 A | 11/1997 | Pazos et al. | 568/619 |
| 5,777,177 A | 7/1998 | Pazos | 568/679 |
| 5,919,988 A * | 7/1999 | Pazos et al. | 502/175 |
| 6,063,309 A | 5/2000 | Hager et al. | 252/182.24 |
| 6,066,683 A * | 5/2000 | Beisner et al. | 252/182.24 |
| 6,136,879 A | 10/2000 | Nishida et al. | 521/174 |
| 6,218,444 B1 * | 4/2001 | Hager et al. | 252/182.24 |
| 6,391,820 B1 * | 5/2002 | Ooms et al. | 502/175 |
| 6,391,935 B1 * | 5/2002 | Hager et al. | 521/157 |

* cited by examiner

*Primary Examiner*—John M. Cooney, Jr.
(74) *Attorney, Agent, or Firm*—Joseph C. Gil; N. Denise Brown

(57) ABSTRACT

This invention relates to a process for the in-situ production of a blend of a polyether monol and a polyether polyol. This process comprises introducing a monol ($S_i$) and a double metal cyanide (DMC) catalyst into a reaction vessel, feeding an epoxide mixture into the vessel and allowing the epoxide to react with the initial starter and continuing to polymerize by feeding epoxide until the equivalent weight of the monol reaches the desired level, then continuously adding a polyfunctional starter ($S_c$) to the reaction vessel while continuing to feed an epoxide mixture, completing addition of the starter, and allowing the mixture to continue to polymerize until the resultant blend of polyether monol and polyether polyol has an average equivalent weight of from about 350 to about 750, and an average functionality of from about 2 to about 4. In-situ polymerized blends of a polyether monol and a polyether polyol are also part of the present invention. The present invention also relates to a process for the production of viscoelastic foams. This process comprises reacting a polyisocyanate component with an isocyanate-reactive component, in the presence of additives, wherein the isocyanate-reactive component comprises at least 50% by weight of the in-situ polymerized blend of a polyether monol and a polyether polyol as described above.

25 Claims, 6 Drawing Sheets

PROCESS FOR THE IN-SITU PRODUCTION OF POLYOL BLENDS, THE IN-SITU PRODUCED POLYOL BLENDS, AND THEIR USE IN THE PRODUCTION OF VISCOELASTIC FOAM

BACKGROUND OF THE INVENTION

This invention relates to a process for the in-situ production of a blend of polyether polyols, and specifically, a blend of one or more polyether monols and one or more polyether polyols, and to the in-situ formed blend of one or more polyether monols and one or more polyether polyols. It further relates to a process for the production of viscoelastic foams from these blends, and to the resultant viscoelastic foams. The process of the present invention requires a double metal cyanide (DMC) catalyst. The process uniquely employs a monol as the initial starter for epoxidation followed at a later stage in the polymerization by the continuous addition of a polyfunctional starter and continued addition of epoxide to yield a blend of a high equivalent weight polyether monol and a much lower equivalent weight polyether polyol in a single reactor batch. These in-situ formed blends of polyether monols and polyether polyols are suitable for the production of viscoelastic polyurethane foams.

Double metal cyanide (DMC) complexes are highly active catalysts for preparing polyether polyols by epoxide polymerization. Recent improvements have resulted in DMC catalysts that have exceptional activity. See, for example, U.S. Pat. No. 5,470,813.

While DMC catalysts have been known since the 1960s, commercialization of polyols made from these catalysts is a recent phenomenon, and most commercial polyether polyols are still produced with potassium hydroxide. One reason for the delayed commercial availability of DMC polyols is that conventional polyol starters, e.g., water, propylene glycol, glycerin, trimethylolpropane, and the like, initiate DMC-catalyzed epoxide polymerizations sluggishly (if at all), particularly in the typical batch polyol preparation process. Typically, the polyol starter and DMC catalyst are charged to a reactor and heated with a small amount of epoxide, the catalyst becomes active, and the remaining epoxide is added continuously to the reactor to complete the polymerization.

In a typical batch process for making polyols using either KOH or a DMC catalyst, all of the polyol starter is charged initially to the reactor. When KOH is used as the catalyst, it is well understood by those skilled in the art that continuous addition of the starter (usually a low molecular weight polyol such as glycerin or propylene glycol) with the epoxide will produce polyols having broader molecular weight distributions compared with products made by charging all of the starter initially. This is true because the rate of alkoxylation with KOH is substantially independent of polyol molecular weight. If low molecular weight species are constantly being introduced, the molecular weight distribution of the polyalkoxylation products will broaden.

Those skilled in the art have assumed that continuous addition of a starter in a DMC-catalyzed polyol synthesis would also produce polyols having relatively broad molecular weight distributions. Consequently, the DMC polyol synthesis art teaches almost exclusively to charge all of the starter to the reactor initially, and to add the epoxide continuously during the polymerization.

One exception is U.S. Pat. No. 3,404,109. This reference discloses a small-scale process for making a polyether diol using a DMC catalyst and water as a starter. This process describes charging a beverage bottle with DMC catalyst, all of the epoxide to be used, and water, and heating the capped bottle and contents to polymerize the epoxide. U.S. Pat. No. 3,404,109 further discloses that "when large amounts of water are employed to yield low molecular weight telomers, it is preferred to add the water incrementally because large amounts of water decrease the rate of telomerization." (See column 7.) Incremental addition of the starter (i.e., water) is used to give a "practical" rate of reaction. Thus, the '109 patent charges all of the epoxide to the reactor initially, but adds the starter incrementally.

Interestingly, U.S. Pat. No. 3,404,109 also discloses that incremental addition of water "can also be employed to give telomers of a broader molecular weight distribution than those possible where all of the water is added at the beginning of the reaction." In other words, the result expected from a DMC-catalyzed process is the same as the result obtained with a KOH-catalyzed process: i.e., the continuous or incremental addition of starter results in polyols with broad molecular weight distributions. Thus, one of ordinary skill in the art upon reading the '109 patent believes that the incremental addition of a starter to a DMC-catalyzed epoxide polymerization will produce polyols having a broader molecular weight distribution than would be obtained if all of the starter were charged initially.

U.S. Pat. No. 5,114,619 discloses a process for making polyether polyols that involves continuous addition of water and epoxide to a reaction mixture containing a barium or strontium oxide or hydroxide catalyst. A DMC-catalyzed process is not disclosed. The process of the '619 patent produces polyols with reduced unsaturation. The impact of continuous water addition in the presence of barium or strontium catalysts on polyol molecular weight distribution is not discussed. The '619 patent further notes that, unlike water, continuous addition of low molecular weight diols, triols, and polyoxyalkylene glycols does not reduce polyol unsaturation. In addition, substitution of KOH for the barium or strontium catalyst does not yield the improvement.

One consequence of charging all of the starter initially, as in a typical batch polyether polyol synthesis, is that reactors must often be used inefficiently. For example, to make a 4000 mol. wt. polyoxypropylene diol (4K diol) from a 2000 mol. wt. polyoxypropylene diol (2K diol) "starter," the reactor is almost half full at the start of the reaction; to make 50 gallons of product, we would start with 25 gallons of 2K diol starter. A valuable process would overcome such "build ratio" limitations, and would permit efficient use of reactors regardless of the molecular weight of the starter or the product sought. For example, it would be valuable to have the option to charge our 50 gallon reactor with only 5 gallons of 2K diol starter, and still make 50 gallons of 4K diol product.

In addition to the process challenges of DMC catalysis, commercial acceptance of DMC-catalyzed polyols has been hindered by the variability of polyol processing and performance, particularly in the production of flexible and molded polyurethane foams. DMC-catalyzed polyols usually cannot be "dropped into" foam formulations designed for KOH-catalyzed polyols because the polyols do not process equivalently. DMC-catalyzed polyols often give too much or too little foam stability. Batch-to-batch variability in the polyols makes foam formulating unpredictable. The cause of this unpredictability in foam formulations with DMC-catalyzed polyols has not been well understood, and consistent results have remained elusive.

An improved process for making DMC-catalyzed polyols is described in U.S. Pat. No. 5,777,177. This process eliminates the need to separately synthesize a polyol starter by KOH catalysis, and enables the use of simple starters such as water, propylene glycol, and glycerin. This process also eliminates the problem of reactor fouling by polyol gels, makes efficient use of reactors, and overcomes build-ratio limitations.

While U.S. Pat. No. 5,777,177 discloses the use of an initial starter and the continuous addition of a second starter to produce polyether polyol with a narrow molecular weight distribution, it fails to disclose and/or suggest that this technology can be used to produce in-situ formed blends of polyols of significantly different and relatively narrow molecular weights in a single batch reactor. More specifically, it fails to disclose the in-situ production of a high molecular weight polyether monol and a very low molecular weight polyether polyol as disclosed and claimed in the present specification.

U.S. Pat. No. 5,689,012 discloses a continuous polyol production process which utilizes the continuous addition of one or more starters. However, as in U.S. Pat. No. 5,777,177, the intent of U.S. Pat. No. 5,689,012 is to produce a polyol of a relatively narrow molecular weight distribution. This reference also fails to disclose and/or suggest a process for the in-situ production of a blend of polyols (and particularly a polyether monol and a polyether polyol) having substantially different molecular weights with each component having a relatively narrow molecular weight distribution. It is not apparent from the disclosure of U.S. Pat. No. 5,689,012 that this continuous polyol process can be used for the in-situ production of a high molecular weight polyether monol and a very low molecular weight polyether polyol as described in the present application.

Copending U.S. application Ser. No. 09/495,192, filed on Jan. 31, 2000, which is now U.S. Pat. No. 6,341,935 which is commonly assigned, discloses the production of viscoelastic, slow-recovery polyurethane foams by reacting an isocyanate component, with an isocyanate-reactive component comprising a high equivalent weight monol and a low equivalent weight polyol, at an isocyanate index of at least 90. According to the disclosure of this application, the monol and polyol used as the isocyanate-reactive component are produced in separate reactions, and a single batch process wherein a high molecular weight polyether monol and a low molecular weight polyether polyol are produced in-situ is not disclosed.

U.S. Pat. No. 4,950,695 discloses to use a monofunctional alcohol or polyether to soften flexible polyurethane foams. The formulations also include a 2000 to 6500 molecular weight triol. Resilience values for the foams are not reported. Accordingly, one of ordinary skill in the art would infer that the foams lack viscoelastic character.

European Patent Application No. 0 913 414 discloses the preparation of viscoelastic polyurethane foams that may contain a polyether monol. The monol, which has a molecular weight less than 1500, is used with a polyol that has a molecular weight greater than 1800. All of the examples show low-index (i.e., less than 90) foams.

Dispersion polyols suitable for the production of hypersoft polyurethane foams are disclosed in U.S. Pat. No. 6,063,309. These polyoxyalkylene dispersion polyols comprise a stable liquid-liquid dispersion of two distinct polyoxyalkylene polyols. The first polyol has a substantial, high polyoxypropylene content internal block and a high polyoxyethylene content external block; and the second polyol consists largely of a high oxyethylene-content block. These compositions form a fine, liquid-liquid dispersion which resists separation and layering and are highly suitable for preparing hypersoft polyurethane foams.

The present invention relates to a unique process wherein DMC catalyzed epoxidation is used to produce a blend of a high equivalent weight monofunctional polyether, i.e., a polyether monol, and a low molecular weight polyfunctional polyether, i.e., a polyether polyol, together (in-situ) in a single reactor batch. This in-situ process eliminates the need for producing, storing, and blending separate polyethers, thus reducing the requirement for multiple tanks and improving production efficiency. Surprisingly, the blend of polyether monol and polyether polyol produced in-situ by this process results in equivalent or superior performance when used in the production of viscoelastic foams when compared to blends made from polyether polyols (i.e., polyether monols and polyether polyols) produced separately.

SUMMARY OF THE INVENTION

The invention is a process for the in-situ production of a blend of polyether polyols, and more specifically, a blend of one or more polyether monols and one or more polyether polyols. This invention also relates to in-situ polymerized blends of a polyether monol and a polyether polyol; to a process for the production of a viscoelastic foam by reacting an isocyanate component with an isocyanate-reactive component, wherein a portion of the isocyanate-reactive component comprises the in-situ polymerized blend of a polyether monol and a polyether polyol; and to the resultant viscoelastic foams.

The process comprises the in-situ production of a blend of a polyether monol and a polyether polyol by polymerizing one or more epoxides, in the presence of a double metal cyanide (DMC) catalyst, an initially charged monofunctional starter ($S_i$), and a continuously added polyfunctional starter ($S_c$). While conventional processes for making DMC-catalyzed polyols and blends of polyols charge all of the starter(s) to be used to the reactor at the start of the polymerization, the process of the invention charges only a monofunctional starter initially ($S_i$) with the DMC catalyst, feeds some epoxide, and allows for reaction between the $S_i$ and the epoxide, and uniquely adds both epoxide and one or more polyfunctional starter compounds ($S_c$) continuously to the reaction mixture during the polymerization.

The process of the invention has surprising and valuable advantages. First, the process provides an efficient route to generate a high equivalent weight monofunctional polyether constituent in the reactor. The DMC catalyst was found to readily initiate epoxidation of the monofunctional starters and the high activity of the catalyst facilitated polymerization to the high equivalent weights required for the intended areas of use. A process involving the more traditional approach of strong base catalysis would require the time consuming steps of dissolving the catalyst in the monol, stripping off excess water and a long reaction time due to the slow epoxidation rate with this class of catalyst. The process would be particularly time consuming for production of monol of equivalent weight greater than about 1,800 due to low reaction rates and the undesired formation of low molecular weight monofunctional starter from isomerization of propylene oxide to allyl alcohol during the base catalyzed process.

Second, the continuous addition of a polyfunctional starter to the preformed polyether monol offers a route to the in-situ generation of a low equivalent weight polyfunctional polyether in the high equivalent weight monol. This is facilitated by the unique ability of the DMC catalyst to promote preferential addition of epoxide monomer to the lowest equivalent weight polyol chains. Surprisingly, by carefully controlling the rate of addition of starter and epoxide, it is possible to produce a low molecular weight polyether polyol having a narrow molecular weight distribution within the higher equivalent weight monol.

Third, the polymerization can be carried out in a sequentially staged single batch process that does not require significantly longer cycle times than a standard single product reaction such as in U.S. Pat. Nos. 5,689,012, 5,777,177, and 5,919,988. The use of an initial starter and the continuous addition of a second starter allows the build ratio to be tailored to the reactor being employed; thus maximizing reactor utilization and production capacity.

Fourth, the in-situ production of the polyether monol and the polyether polyol in a single reactor batch process offers significant efficiency and cost advantages over producing the polyether monol and polyether polyol separately, and then blending the two together. Instead of requiring a storage tank for each of the two components and a third storage tank for the blend, it is only necessary to have a tank for the blend. Also, the inventory is substantially reduced since it is not necessary to maintain the intermediate polyether monol and polyether polyols for blending. In addition, the time and expense of blending products is also eliminated.

Fifth, by controlling the epoxide feed composition in different stages of the reaction it is possible to vary the composition of the polyether monol and polyether polyol in a nearly independent fashion even though they are produced in-situ in a single reactor. For example, propylene oxide may be fed during the polymerization of the polyether monol to yield a low reactivity component and then a mixture of ethylene oxide and propylene oxide may be fed during the continuous addition of the higher functionality starter to produce a more reactive component. Because epoxide adds preferentially to the lower equivalent weight polyether polyol, the polyether monol will remain predominantly poly(oxypropylene) while the polyether polyol can have a relatively high poly(oxyethylene) content.

Finally, it was also unexpectedly found that these in-situ produced blends offer equivalent or superior performance in the production of viscoelastic foams as compared to blends made from polyether monols and polyether polyols which were produced separately.

DETAILED DESCRIPTION OF THE INVENTION

Figure 1:
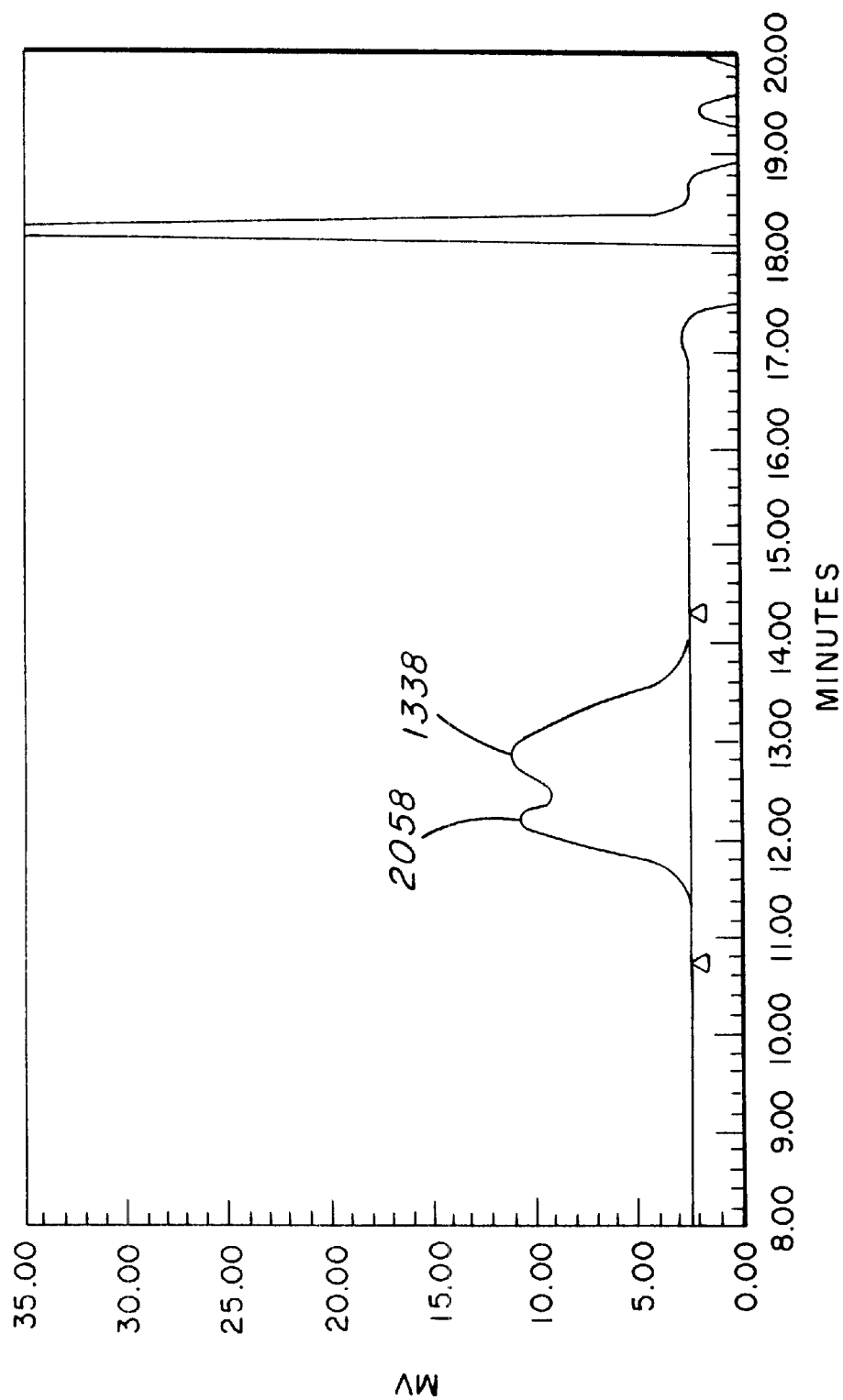
FIGS. 1–6 are results of gel permeation chromatography (GPC) analyses of the blends of polyether monols and polyether polyols produced in-situ by the process of the present invention. These six (6) GPC diagrams correspond to Examples 1 6 of the present application, respectively, and are described more thoroughly in the examples.

The process of the invention comprises a process for the in-situ production of a blend of polyether polyols, specifically a blend of one or more polyether monols and one or more polyether polyols, by polymerizing an epoxide in the presence of a double metal cyanide (DMC) catalyst, an initially charged monofunctional starter ($S_i$), and a continuously added polyfunctional starter ($S_c$).

In particular, the process for the in-situ production of these blends in accordance with the present invention comprises:

A) charging into a reaction vessel a mixture that comprises:
   (1) an initial starter ($S_i$) comprising a monofunctional compound (i.e., a monol) having an equivalent weight of at least about 200; and
   (2) a DMC (double metal cyanide) catalyst;
B) feeding
   (1) an epoxide comprising propylene oxide and ethylene oxide in a weight ratio of from 100:0 to 20:80 (preferably of 100:0 to 40:60 and more preferably about 100:0 to 55:45), into the reaction vessel containing the DMC catalyst and the $S_i$;
C) allowing the epoxide mixture and the $S_i$ (monofunctional starter) to polymerize by feeding the epoxide, until the equivalent weight of the monofunctional compound is increased by at least 10% by weight (based on the initial equivalent weight) and the equivalent weight reaches a value between about 1,500 and about 6,000, preferably between about 2,000 and 4,000;
D) continuously adding
   (1) a continuous starter ($S_c$) comprising one or more polyols having an average functionality of from about 2.0 to about 8, preferably about 3, and an equivalent weight of about 28 to about 400 (with glycerine being the preferred $S_c$), into the reaction vessel, while continuing to feed the epoxide mixture;
E) completing addition of the continuous starter ($S_c$); and
F) allowing the mixture to continue to polymerize in the reaction vessel until the resultant polyether monol and polyether polyol blend has an overall equivalent weight of about 350 to about 750 (preferably of about 450 to about 700), an average functionality of about 2 to about 4 (preferably about 2.2 to about 2.8), and which comprises:
   (1) from about 25 to about 75% by weight, based on 100% by weight of F)(1) and F)(2), of a polyether monol having an equivalent weight of 1,500 to 6,000; and
   (2) from about 25 to about 75% by weight, based on 100% by weight of F)(1) and F)(2), of a polyether polyol having an average functionality of about 2.0 to about 8, and an equivalent weight of 200 to 500.

Generally, any epoxide polymerizable using DMC catalysis can be used in the process for the in-situ production of a blend of a polyether monol and a polyether polyol in accordance with the present invention. Preferred epoxides are ethylene oxide, propylene oxide, butylene oxides (e.g., 1,2-butylene oxide, isobutylene oxide), styrene oxide, and the like, and mixtures thereof. Polymerization of epoxides using DMC catalysts and hydroxyl-containing starters results in polyether polyols, as is well understood in the art.

Other monomers that will copolymerize with an epoxide in the presence of a DMC catalyst can be included in the process of the invention to make other types of epoxide polymers. For example, epoxides copolymerize with oxetanes as described in U.S. Pat. No. 3,404,109, the disclosure of which is herein incorporated by reference, to give polyethers, or with anhydrides to give polyesters or polyetheresters as described in U.S. Pat. Nos. 5,145,883 and 3,538,043, the disclosures of which are herein incorporated by reference.

The process of the invention requires an initially charged starter ($S_i$), which is different than the continuously added starter ($S_c$). The initially charged starter, $S_i$, is comprised of, either totally or in large part, one or more compounds having one active hydrogen per molecule that can serve as a site for epoxide addition. The preferred starters are polyoxyalkylene monols formed by addition of multiple equivalents of epoxide to low molecular weight monofunctional starters such as, for example, methanol, ethanol, phenols, allyl alcohol, longer chain alcohols, etc., and mixtures thereof. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group.

A preferred class of polyoxyalkylene monol starter, $S_i$, consists of polyoxypropylene monols having an average equivalent weight of at least 200, and more preferably greater than about 1,000. These compounds facilitate DMC catalyzed addition of epoxide and provide suitable build ratios for the production of the preferred monol-polyol compositions of the present invention.

In the process of the present invention, the quantity of an $S_i$ used depends on many factors, including, for example, the reactor dimensions, the identity of the $S_i$, the equivalent weights of the $S_i$ and of the target product, the equivalent weight of the $S_c$, and other factors. Preferably, the amount of $S_i$ is within the range of about 2 to about 75 mole % of the total moles of $S_i$ and $S_c$. The total amount of starter ($S_t$) equals the sum of the amount of continuously added starter ($S_c$) plus the amount of initially charged starter ($S_i$). Thus, $S_t = S_c + S_i$.

The catalyst is a double metal cyanide (DMC) catalyst. Any DMC catalyst known in the art is suitable for use in the process of the present invention. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the disclosures of which are incorporated herein by reference. Particularly preferred DMC catalysts are zinc hexacyanocobaltates.

The DMC catalyst includes an organic complexing agent. As the preceding references teach, the complexing agent is needed for an active catalyst. Preferred complexing agents are water-soluble heteroatom-containing organic compounds that can complex with the DMC compound. Particularly preferred complexing agents are water-soluble aliphatic alcohols. Tert-butyl alcohol is most preferred. The DMC catalyst may include, in addition to the organic complexing agent, a polyether, as is described in U.S. Pat. No. 5,482,908.

Preferred DMC catalysts for use in the process are highly active catalysts such as those described in U.S. Pat. Nos. 5,482,908 and 5,470,813, the disclosures of which are herein incorporated by reference. High activity allows the catalysts to be used at very low concentrations, preferably at concentrations low enough to overcome any need to remove the catalyst from the finished blends of polyether monol and polyether polyol products.

The process of the invention also requires a continuously added polyfunctional starter ($S_c$). Conventional processes for making polyether polyols, including KOH-catalyzed and DMC-catalyzed processes, charge the catalyst and all of the starter to be used to the reactor at the start of the polymerization, and then add the epoxide continuously. In contrast, the process of the invention charges the DMC catalyst and an initial monofunctional starter ($S_i$) to the reactor followed by epoxide feed and polymerization until the monol reaches the desired equivalent weight. At this point, the feed of $S_c$ is begun and proceeds at a continuous controlled rate relative to the continuing epoxide feed until the addition of the continuous starter ($S_c$) is completed. Epoxide feed is continued until the desired overall OH number, is reached. The $S_c$ may be mixed with the epoxide and added, or preferably, it is added as a separate stream.

The $S_c$ is preferably a low molecular weight polyol or a blend of low molecular weight polyols. Low molecular weight polyols as defined in this application have about 2 to about 8 hydroxyl groups, preferably about 3 hydroxyl groups, and an average equivalent weight of about 28 to about 400, preferably about 28 to about 100. Suitable low molecular weight polyols include compounds such as, for example, glycerin, propylene glycol, dipropylene glycol, ethylene glycol, trimethylolpropane, sucrose, sorbitol, tripropylene glycol, and the like, and mixtures thereof. Preferred continuously added starters are glycerin and trimethylolpropane. Low molecular weight polyether polyols prepared by multiple epoxide addition to these polyols or other starters with two or more active hydrogens may also be employed as $S_c$.

The $S_c$ can also be other compounds having at least two active hydrogens per molecule, which are known to be suitable initiators for conventional DMC-catalyzed epoxide polymerizations, including compounds such as, for example, alcohols, thiols, aldehydes and ketones containing enolizable hydrogens, malonic esters, phenols, carboxylic acids and anhydrides, aromatic amines, acetylenes, and the like, and mixtures thereof. Examples of suitable active hydrogen-containing compounds appear in U.S. Pat. Nos. 3,900,518, 3,941,849, and 4,472,560, the disclosures of which are incorporated herein by reference.

The amount of $S_c$ used is at least about 25 mole percent of the total amount of starter used.

$$\text{mole \% } S_c = \left(\frac{\text{moles } S_c}{\text{moles } S_c + \text{moles } S_i}\right) \times 100$$

As described previously, a wide variety of epoxides can be employed in the current process. Propylene oxide and ethylene oxide are the preferred epoxides. A unique feature of the current process is that the compositions of the epoxide can be varied to control the composition of the polyether monol and polyether polyol constituents in the final product. For example, propylene oxide can be added alone during polymerization of the monol, prior to the start of the addition of the $S_c$, the continuously added starter. After $S_c$ addition is started, a blend of ethylene oxide and propylene oxide can be fed to yield a high functionality polyether polyol comprised of a poly(oxyethylene-oxypropylene) copolymer. Because oxide addition via DMC catalysis occurs predominantly on the lower equivalent weight polyether polyol, the polyether monol component can remain largely poly(oxypropylene). By reversing these sequences, the polyether monol could be produced with higher poly(oxyethylene) content and the polyether polyol could be predominantly poly(oxypropylene).

The epoxide composition may also be varied during the initial polymerization of the monol and/or at some point during and/or after the addition of $S_c$. This provides flexibility for controlling the distribution of oxyethylene or oxypropylene within the polyether monol and polyether polyol and allows some control of the primary versus secondary hydroxyl functionality of the polyether monol and polyether polyol, and thus, the relative reactivity of the constituents in the final composition. In this way, it is possible to design the product to meet the reactivity and performance requirements of the intended applications such as polyurethane foams.

In-situ polymerized blends of polyether monols and polyether polyols produced via the process of the present invention are characterized by an overall equivalent weight of from about 350 to about 750, preferably from about 450 to about 700, and have an average functionality of about 2 to about 4, preferably from about 2.2 to about 2.8. These in-situ polymerized blends comprise:

(1) from about 25 to 75% by weight, based on 100% of the combined weight of (1) and (2), of a polyether monol having an equivalent weight of from about 1,500 to about 6,000, preferably from about 2,000 to about 4,000; and (2) from about 25 to 75% by weight, based on 100% of the combined weight of (1) and (2), of a polyether polyol having an equivalent weight of from about 200 to about 500 (preferably from about 300 to about 400) and an average functionality of from about 2.0 to about 8 (preferably from about 2.5 to about 3.5, more preferably about 3).

These in-situ polymerized blends of polyether monols and polyether polyols produced via the above described process have been found to be useful in the production of slow recovery "viscoelastic" foam. This type of foam has found widespread use in the production of pillows, mattress toppers, ergonomic pads, sports equipment, and the like. It was unexpectedly found that the in-situ produced blends exhibit equivalent or even superior performance to similar polyether monols and polyether polyols produced separately and blended together. The production of such viscoelastic foams is described in detail in U.S. application Ser. No. 09/495,192, filed in the U.S. Patent and Trademark Office on Jan. 31, 2000, which is commonly assigned, the disclosure of which is herein incorporated by reference.

Commercial production of viscoelastic foams involves mixing together a suitable polyisocyanate, a blowing agent, and an isocyanate-reactive component or mixture in the presence of a surfactant, one or more catalysts, and various other compounds which are known in the field of polyurethane chemistry to be suitable for preparing viscoelastic foams. Other isocyanate-reactive compounds to be used in addition to the above described in-situ formed blends of polyether monols and polyether polyols are well known in the field of polyurethane chemistry. These include the relatively high molecular weight compounds such as, for example, polyether polyols, polyester polyols, polymer polyols, amine-terminated polyethers, polythioethers, polyacetals and polycarbonates, as well as various low molecular weight chain extenders and/or crosslinking agents both of which may contain hydroxyl groups and/or amine groups capable of reacting with the isocyanate groups of the isocyanate component.

As used herein, the term nominal equivalent weight refers to the expected molar weight per reactive hydroxyl group assuming the epoxide adds exclusively to the low equivalent weight polyol component, once the continuous polyol starter ($S_c$) feed is begun. The nominal molecular weight is the nominal number average equivalent weight multiplied by the starter functionality. The nominal hydroxyl number equals 56,100 divided by the nominal equivalent weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

A polyol with two distinct molecular weights was produced in-situ by employing the double metal cyanide catalyzed process for polyoxyalkylene polyol production as described in U.S. Pat. Nos. 5,689,012 and 5,777,177, the disclosures of which are herein incorporated by reference.

A reactor was charged with a 35 hydroxyl number (1600 Da equivalent weight) monol having a polyoxyalkylene portion containing ca. 100% by weight oxypropylene moieties. Zinc hexacyanocobaltate t-butanol complex catalyst in an amount of 60 to 90 ppm based on the weight of product polyol was added to the reactor and oxyalkylation commenced with propylene oxide. When oxyalkylation proceeded to the point where the hydroxyl number was 24±2, glycerine co-feed was started. The oxide feed contained 6.7 weight percent glycerine. This was calculated by the formula: [(wt. Gly.)×100/(wt. Gly. +wt. Oxide)]. The feed was continued until the hydroxyl number reached 82. The resultant product was a mixed functional polyol blend consisting of a high equivalent weight polyether monol (nominally 2340 Da, and 24 hydroxyl number) and a low equivalent weight polyether triol (nominally ca 510 Da, and 110 hydroxyl number) with a nominal molecular weight of 1530 Da. The high equivalent weight polyether monol comprised about 30 weight percent of the product. The distinct molecular weight distributions for the two components of the blend produced by this process are demonstrated in FIG. 1 by the GPC (Gel Permeation Chromatography) Technique described below. The polyether monol had a peak molecular weight of 2058 and the polyether triol had a peak molecular weight of 1338.

Gel Permeation Chromatograph (GPC) Technique:

Polyether polyol samples were analyzed by gel permeation chromatography using HPLC grade chloroform as the elution solvent (flow rate=1 mL/min). A Waters Alliance 2690 liquid chromatograph was used with a Pigel 3iLim MIXED-E column (Polymer Laboratories) and a refractive index detector (output in millivolts).

The instrument was calibrated using polyethylene glycol standards (Scientific Polymer Products) ranging in peak molecular weight from 320 to 19,000 Da. The peak molecular weights that are reported for the examples were based on these calibration standards. Actual molecular weights may vary somewhat from the measured values due to composition and functionality differences from the standards.

Example 2

Figure 2:
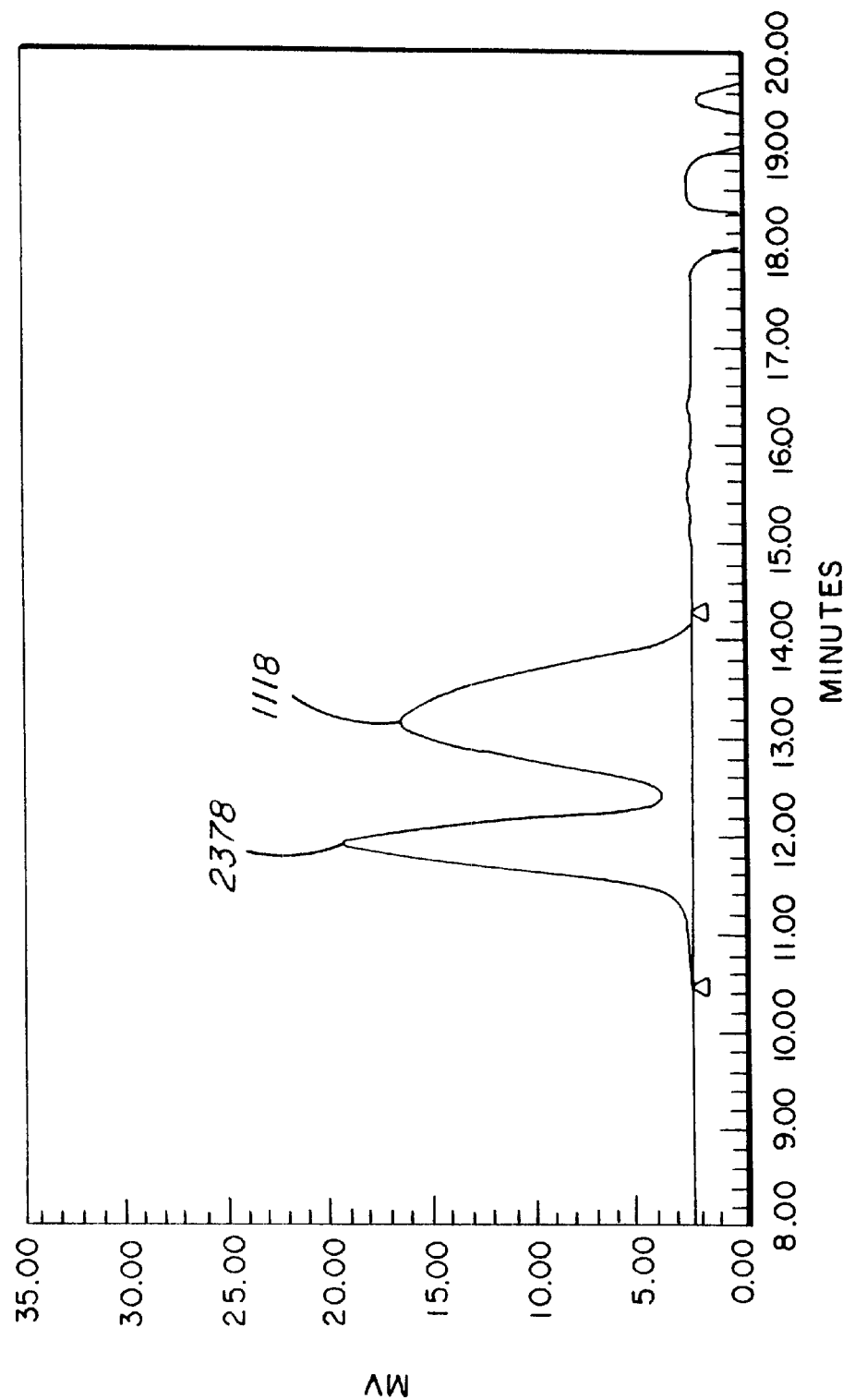

The procedure as described in Example 1 was essentially repeated with the following changes. The glycerine co-feed was started when the oxyalkylation had proceeded to the point where the hydroxyl number of the polyether monol was 20±2. The co-feed employed had a slightly higher proportion (about 8.6%) of continuously added glycerine in the feed, and the feed was continued until the hydroxyl number of the polyether product reached 92. The product was a mixed functional polyol consisting of a polyether monol with a nominal 20 hydroxyl number (ca 2800 Da equivalent weight), and a polyether triol with a nominal 130 hydroxyl number (ca 430 Da equivalent weight, 1290 Da molecular weight). The polyether monol comprised about 40 weight percent of the product. The distinct molecular weight distributions for the two components of the blend produced by this process are demonstrated in FIG. 2 by the GPC Technique as described above. The polyether monol had a peak molecular weight of 2378 and the polyether triol had a peak molecular weight of 1118.

Example 3

Figure 3:
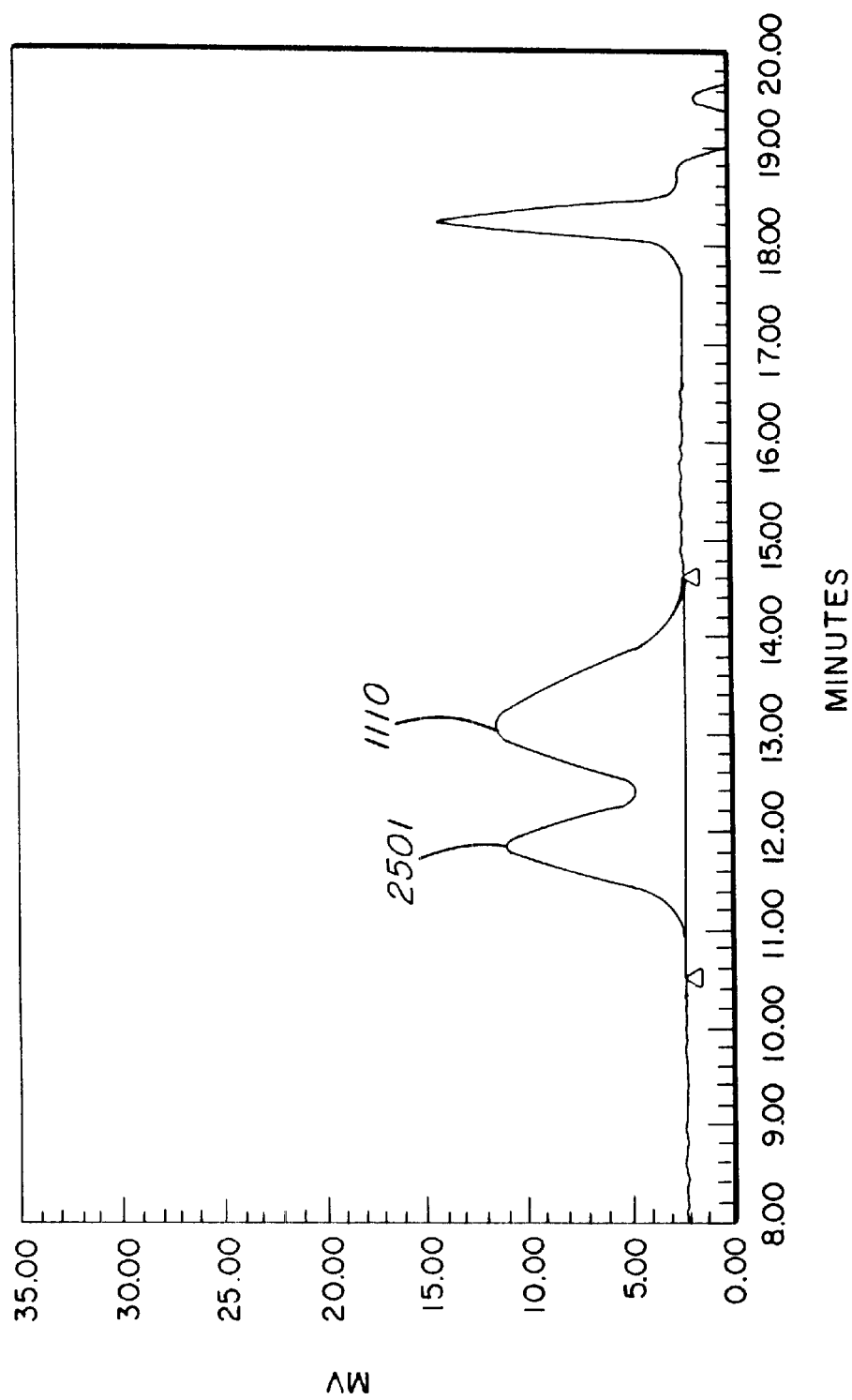

The procedure as described in Example 2 above was essentially repeated with the following changes. The oxyalkylation of the 36 hydroxyl number monol was commenced with feed comprising propylene oxide and ethylene oxide in a weight ratio of 80:20. The oxyalkylation was finished with a feed comprising propylene oxide and ethylene oxide in a weight ratio of 100:0 for the last 5 weight percent of the feed. A slightly higher proportion (about 8.9%) of continuously added glycerine was employed in the feed, and the feed was continued until the hydroxyl number of the product reached 93. The product was a mixed functional polyol consisting of a polyether monol with an ethylene oxide rich end and a nominal 20 hydroxyl number (ca 2800 Da equivalent weight), and a polyether triol with a polyoxyalkylene portion, propylene oxide rich end and a nominal 140 hydroxyl number (ca 400 Da equivalent weight, 1200 Da molecular weight). The polyether monol comprised about 40 weight percent of the product. The distinct molecular weight distributions for the two components of the blend produced by this process are demonstrated in FIG. 3 by the GPC Technique as described above. The polyether monol had a peak molecular weight of 2501 and the polyether triol had a peak molecular weight of 1110.

Example 4

Figure 4:
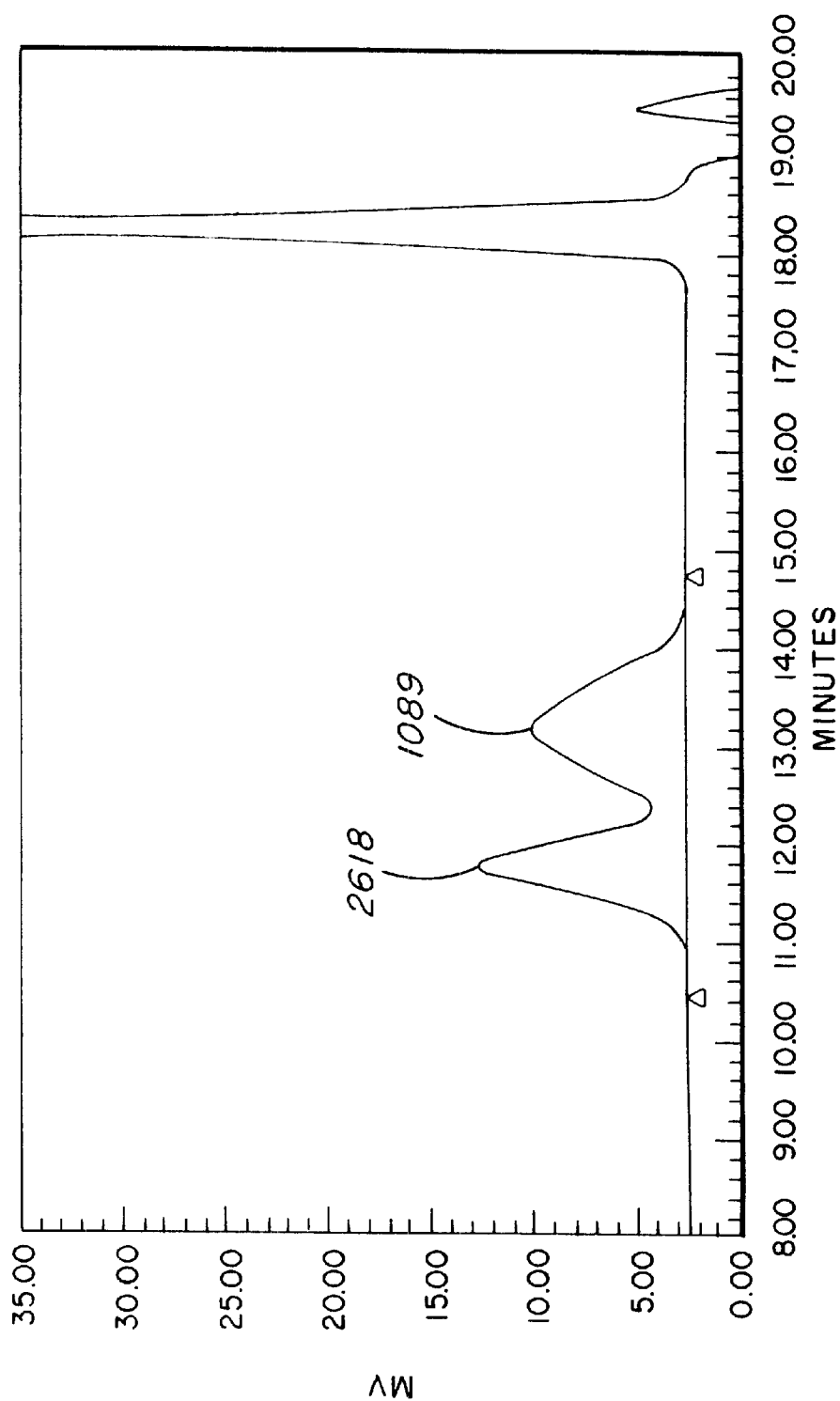

The procedure as described in Example 2 above was essentially repeated with the following changes. The oxyalkylation commenced with a feed comprising propylene oxide and ethylene oxide in a weight ratio of 84:16, with the glycerine co-feed being started when the hydroxyl number was 18±2 and continued until the hydroxyl number reached 85. The product was a mixed functional polyol consisting of a polyether monol with an ethylene oxide rich end and a nominal 18 hydroxyl number (ca 3120 Da equivalent weight), and a polyether triol with mixed polyoxyalkylene and a nominal 140 hydroxyl number (ca 400 Da equivalent weight, 1200 Da molecular weight). The polyether monol comprised about 45 weight percent of the product. The distinct molecular weight distributions for the two components of the blend produced by this process are demonstrated in FIG. 4 by the GPC Technique as described above. The polyether monol had a peak molecular weight of 2618 and the polyether triol had a peak molecular weight of 1089.

Example 5

Figure 5:
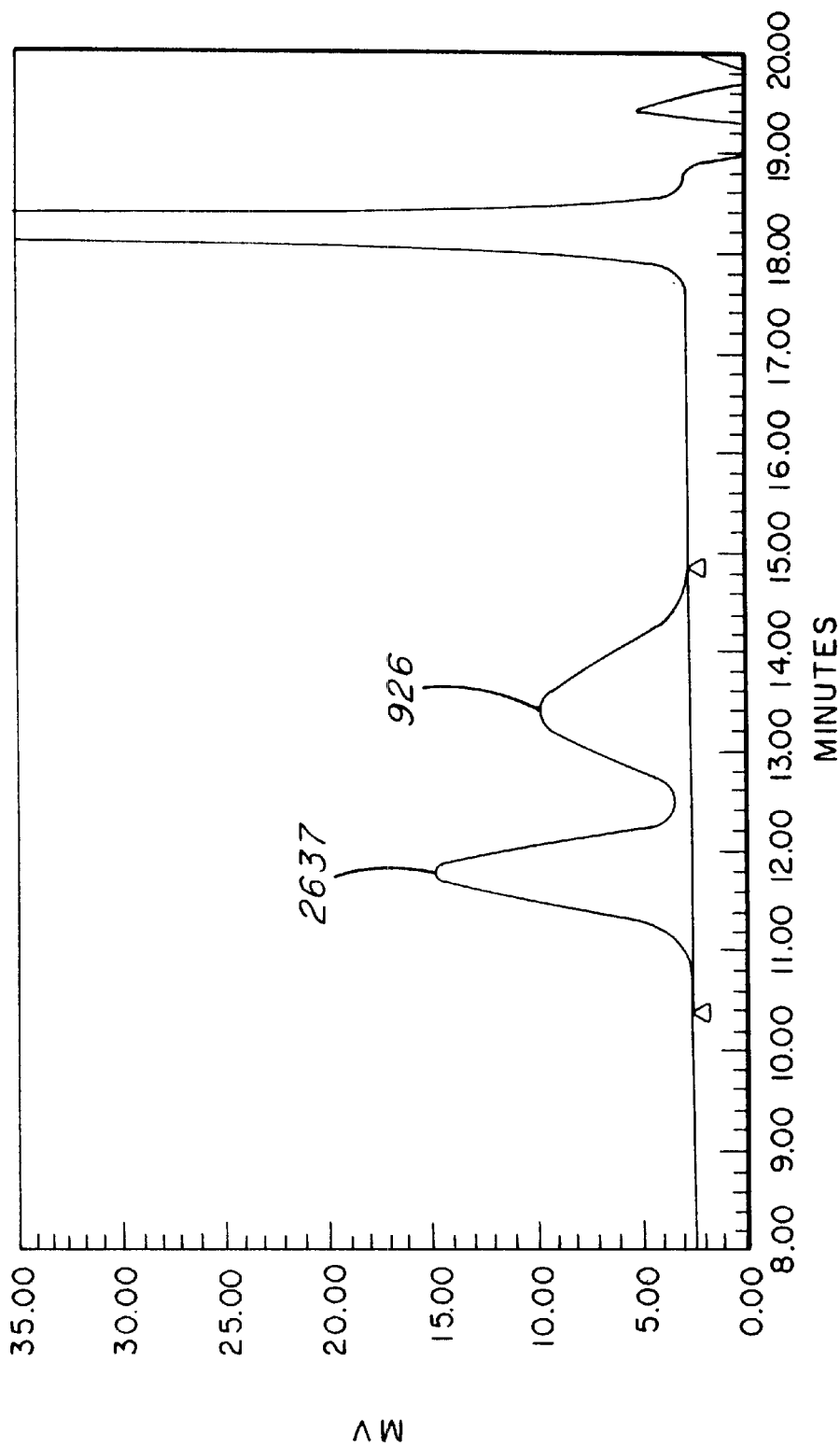

The procedure as described in Example 4 was essentially repeated with the following changes. The oxyalkylation commenced with a 80:20 weight ratio of propylene oxide to ethylene oxide, the feed employed a slightly higher proportion of continuously added glycerine and the feed was continued until the hydroxyl number reached 94. The product was a mixed functional polyol consisting of a polyether monol with an ethylene oxide rich end and a nominal 18 hydroxyl number (ca 3120 Da equivalent weight), and a polyether triol with mixed polyoxyalkylene and a nominal 170 hydroxyl number (ca. 330 Da equivalent weight, 990 Da molecular weight). The polyether monol comprised about 50 weight percent of the product. The distinct molecular weight distributions for the two components of the blend produced by this process are demonstrated in FIG. 5 by the GPC Technique as described above. The polyether monol had a peak molecular weight of 2637 and the polyether triol had a peak molecular weight of 926.

Example 6

Figure 6:
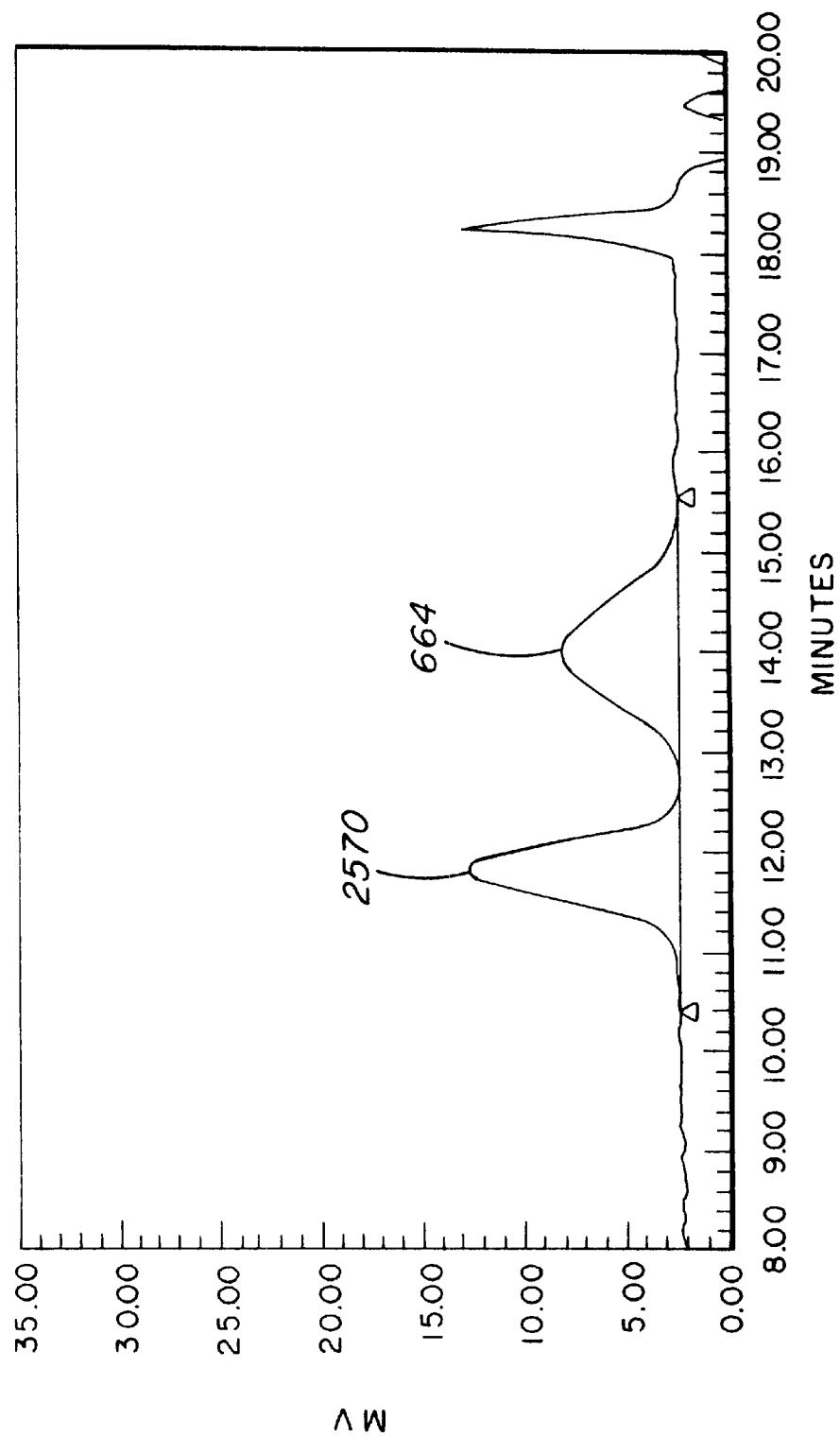

The procedure as described above in Example 5 was essentially repeated except for the following changes. After oxyalkylation, the feed employed a higher proportion (about 16.6%) of continuously added glycerine, and was continued until the hydroxyl number reached 130. The product was a mixed functional polyol consisting of a polyether monol with an ethylene oxide rich end and a nominal 18 hydroxyl number (ca 3120 Da equivalent weight), and a polyether triol with mixed polyoxyalkylene and a nominal 240 hydroxyl number (ca 235 Da equivalent weight, 705 Da molecular weight). The polyether monol comprised about 50 weight percent of the product. The distinct molecular weight distributions for the two components are demonstrated in FIG. 6. The polyether monol had a peak molecular weight of 2570, and the polyether triol had a peak molecular weight of 664.

The following components were used in the preparation of viscoelastic foams.

MS-1: a blend of monofunctional alcohols having an average molecular weight of about 200; commercially available as Neodol 25 from Shell Chemical MS-2: a 35 OH number polyether monol formed by propoxylating MS-1 in the presence of a DMC catalyst (no ethylene oxide co-feed was used).

M-1: a blend of monofunctional polyether alcohols having an average hydroxyl number of 20, and being formed by KOH propoxylation of MS-2

M-2: a blend of monofunctional polyether alcohols having an average hydroxyl number of 20, and an average polymerized ethylene oxide content of about 10% by weight, and being prepared by DMC alkoxylation of MS-2 with propylene oxide and ethylene oxide M-3: a monofunctional polyether alcohol having an average hydroxyl number of 21 and an average polymerized ethylene oxide content of about 15% by weight and being prepared by DMC catalyzed alkoxylation of MS-2 with propylene oxide and ethylene oxide MP-1: the in-situ formed blend of a polyether monol and a polyether triol prepared in Example 2 above MP-2: the in-situ formed blend of a polyether monol and a polyether triol produced in Example 3 above P-1: a polyether trio having an hydroxyl number of about 135 and prepared by propoxylation of glycerin P-2: a polyether triol having an hydroxyl number of about 135 and prepared by DMC catalyzed alkoxylation of a 240 hydroxyl number initiator having a functionality of 3 (i.e., propoxylated glycerin) with a blend of propylene oxide and ethylene oxide (20% EO in product)

P-3: a polyether triol having an hydroxyl number of about 150 and prepared by propoxylation of glycerin PG: propylene glycol Catalyst 1: an amine catalyst blend, commercially available as NIAX C-183 from OSi Specialties Catalyst 2: stannous octoate catalyst; commercially available as Dabco T-9 from Air Products Surfactant 1: a silicone surfactant, commercially available as Niax Silicone L620 from OSi Specialties Flame retardant: DE60F Special from Great Lakes Chemicals TDI: a blend of 80% by wt. of 2,4-toluene diisocyanate and 20% by weight of 2,6-toluene diisocyanate The following general procedure was used to produce the viscoelastic foams in Examples 7–12 below.

A series of nominally 3 lb/ft³ (PCF) free-rise viscoelastic foams was prepared in the laboratory using conventional bench foaming procedures. The ingredients other than toluene diisocyanate (TDI) were mixed thoroughly. Next, TDI (a commercial 80:20% by wt. mixture of the 2,4-isomer and 2,6-isomer) was added and briefly mixed. The mixture was poured into a standard 14 inch (35.6 cm)×14 inch×6 inch (15.2 cm) cake box. The mixture was allowed to rise freely to full height, after which the degree of settling was measured. The foam was cured in an oven at 145° C. for 30 mins. After a minimum of 16 hrs. at room temperature, shrinkage, if any, was noted, and a 12 inch (30 cm)×12 inch×4 inch (10 cm) sample was cut for physical testing. The formulations, processing characteristics, and foam properties are set forth below in Tables 1 and 2.

The polyol constituents of comparative Examples 7, 9 and 11 are comprised of polyether monols and polyether polyols which are produced separately and then blended into the foam formulations. The in-situ polymerized blends of polyether monols and polyether polyols of Examples 8, 10 and 12 are of similar composition and equivalent weight to the polyether monols and polyether polyols of comparative examples 7, 9, and 11, respectively. As shown in Tables 1 and 2, both the blends of individually prepared polyether monols and polyether polyols and the in-situ polymerized blends of polyether monols and polyether polyols produced good quality viscoelastic foam in each case. It is also apparent in each comparison (Example 7 vs. 8, 9 vs. 10 and 1 1 vs. 12) that the in-situ produced blend exhibited improved compression set (90% compression set, 75% humid aged compression set (HACS) and 50% wet set) performance. The values listed show the percentage loss in height after the foam is held in a compressed state at elevated temperatures. Higher compression sets can indicate tendencies for the foam to lose height in use.

The 90% compression set and the 75% HACS test methods are described in ASTM D3574. Height loss was determined as the percentage of the deflected height that was not recovered ($C_d$ method). Condition $J_1$ (3 hours at 105° C.) was used for the humid age conditioning. The 50% wet set was run in a similar manner to the 90% compression set test except the sample was compressed to 50% of its original height and held in this compressed state for 22 hours at 50° C. and 95% relative humidity. The loss in height of the original specimen was measured after a 30 minute recovery period at standard lab conditions.

TABLE 1

VISCOELASTIC FOAMS MADE WITH BLENDED MONOLS AND TRIOLS VS. IN-SITU FORMED BLENDS OF MONOLS AND TRIOLS

| Foam Formulation | Example 7 | Example 8 | Example 9 | Example 10 | Example 11 | Example 12 |
|---|---|---|---|---|---|---|
| M-1 | 37 | | | | | |
| M-2 | | 40 | | | | |
| M-3 | | | | 40 | | |
| MP-1 | | 100 | | | | |
| MP-2 | | | | 100 | | 100 |
| P-1 | 63 | | | | | |
| P-2 | | | 60 | | | |
| P-3 | | | | | 60 | |
| PG | 1.0 | 1.0 | 1.0 | 1.0 | 0.5 | |
| Water | 1.9 | 1.9 | 1.9 | 1.9 | 1.9 | 1.9 |
| Catalyst 1 | 0.34 | 0.34 | 0.40 | 0.40 | 0.40 | 0.40 |
| Catalyst 2 | 0.10 | 0.10 | 0.12 | 0.12 | 0.12 | 0.12 |
| Surfactant 1 | 0.5 | 0.5 | 0.4 | 0.4 | 0.4 | 0.4 |
| Flame retardant | 3.0 | 3.0 | | | | |
| TDI | 34.5 | 34.2 | 34.0 | 34.6 | 32.0 | 32.3 |
| Index | 100 | 100 | 100 | 100 | 100 | 100 |
| Foam Processing | Good | Good | Good | Good | Good | Good |

TABLE 2

PROPERTIES OF THE VISCOELASTIC FOAMS PREPARED IN TABLE 1

| Foam Properties | Example 7 | Example 8 | Example 9 | Example 10 | Example 11 | Example 12 |
|---|---|---|---|---|---|---|
| Density, pcf | 2.81 | 2.81 | 2.79 | 2.89 | 2.75 | 2.73 |
| Resilience, % | 8 | 10 | 4 | 3 | 19 | 10 |
| Air Flow, scfm | 1.30 | 0.75 | 0.48 | 0.03 | 1.55 | 0.75 |
| IFD Thickness | 3.98 | 3.98 | 4.05 | 4.02 | 4.00 | 4.02 |
| 25% IFD, lbs | 13.85 | 14.75 | 12.28 | 12.83 | 13.35 | 14.20 |
| 65% IFD, lbs | 28.98 | 30.75 | 24.15 | 24.73 | 28.01 | 27.89 |
| 25% Return, % | 77.83 | 77.02 | 77.77 | 77.32 | 81.87 | 79.30 |
| 65/25 IFD | 2.09 | 2.08 | 1.97 | 19.3 | 2.10 | 1.96 |
| Tensile, psi | 10.07 | 9.23 | 10.41 | 10.22 | nd | nd |
| Elongation, % | 218 | 203 | 234 | 242 | nd | nd |
| Tear, pli | 0.82 | 0.75 | 0.87 | 0.80 | 0.57 | 0.50 |
| 90% Comp. Set, % | 6.45 | 4.86 | 6.53 | 5.01 | 8.77 | 5.45 |
| 75% HACS, % | 6.09 | 5.00 | 5.76 | 4.84 | nd | nd |
| 50% Wet Set, % | 3.07 | 2.26 | 2.76 | 2.61 | 4.28 | 2.91 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the in-situ production of a blend of a polyether monol and a polyether polyol, comprising:

A) introducing into a reaction vessel a mixture comprising:
(1) an initial starter ($S_i$) comprising one or more monofunctional compounds, and
(2) a DMC (double metal cyanide) catalyst, B) feeding
(1) an epoxide comprising propylene oxide and ethylene oxide in a weight ratio of from 100:0 to 20:80, into the reaction vessel;

C) allowing said epoxide mixture and said initial starter ($S_i$) to react and continuing to polymerize by feeding the epoxide until the equivalent weight of the monofunctional compound is increased by at least 10% by weight and reaches a value between about 1,500 and about 6,000;

D) continuously adding (1) a low molecular weight starter ($S_c$) having a functionality of 2.0 to 8 and an equivalent weight of about 28 to about 400; into the reaction vessel while continuing to feed epoxide;

E) completing addition of the continuous starter ($S_c$); and

F) allowing the mixture to continue to polymerize in the reaction vessel until the resultant monol and polyol blend has an overall average equivalent weight from about 350 to about 750 and an average functionality of about 2 to about 4 and comprises
  (1) from about 25 to 75% by weight, based on 100% by weight of F)(1) and F)(2), of a polyether monol having an equivalent weight of from about 1,500 to about 6,000; and
  (2) from about 25 to 75% by weight, based on 100% by weight of F)(1) and F)(2), of a polyether polyol having an equivalent weight of from about 200 to about 500 and an average functionality of from about 2.0 to about 8.

2. The process of claim 1, wherein the weight ratio of propylene oxide to ethylene oxide in the epoxide which is continuing to be fed in step C) is varied from the actual weight ratio of propylene oxide to ethylene oxide in the epoxide which is fed into the reaction vessel in step B) in that a higher average ratio of ethylene oxide to propylene oxide is present in step C).

3. The process of claim 1, wherein the weight ratio of propylene oxide to ethylene oxide in the epoxide which is continuing to be fed in step D) is varied from the actual weight ratio of propylene oxide to ethylene oxide in the epoxide which is fed into the reaction vessel in step B) in that a higher average ratio of ethylene oxide to propylene is present in step D).

4. The process of claim 3, wherein the weight ratio of propylene oxide to ethylene oxide in the epoxide composition which is continuing to be fed in step D) is varied from the actual weight ratio of propylene oxide to ethylene oxide in the epoxide composition fed into the reaction vessel in step C) in that a higher average ratio of ethylene oxide to propylene oxide is present in step D).

5. The process of claim 1, wherein A)(1) the initial starter ($S_i$) has an equivalent weight of at least about 200.

6. The process of claim 1, wherein B)(1) the epoxide comprises propylene oxide and ethylene oxide in a weight ratio of from 100:0 to 40:60.

7. The process of claim 1, wherein the reaction between the epoxide mixture and the initial starter ($S_i$) in step C) continues until the equivalent weight of the polyether monol reaches a value between 2,000 and 4,000.

8. The process of claim 1, wherein D)(1) the low molecular weight starter ($S_c$) has a functionality of about 3 and an equivalent weight of about 28 to about 100.

9. The process of claim 8, wherein D)(1) the low molecular weight starter ($S_c$) comprises glycerine.

10. The process of claim 1, wherein the mixture is allowed to continue to react in F) until the resultant polyether monol and polyether polyol blend has an overall average equivalent weight of from about 450 to about 700 and an average functionality of about 2.2 to about 2.8.

11. An in-situ polymerized blend of a polyether monol and a polyether polyol characterized by an overall equivalent weight of from about 350 to about 750 and an average functionality of about 2 to about 4 and comprising:
  (1) from about 25 to about 75% by weight, based on the total weight of the blend, of a polyether monol having an equivalent weight of from about 1,500 to about 6,000; and
  (2) from about 25 to about 75% by weight, based on the total weight of the blend, of a polyether polyol having an equivalent weight of from about 200 to about 500 and an average functionality of from about 2.0 to about 8.

12. The in-situ polymerized blend of claim 11, wherein the overall equivalent weight is from about 450 to about 700 and the average functionality is from about 2.2 to about 2.8.

13. The in-situ polymerized blend of claim 11, wherein
  (1) said polyether monol has an equivalent weight of from about 2,000 to about 4,000; and
  (2) said polyether polyol has an equivalent weight of from about 300 to about 400 and an average functionality of about 2.5 to about 3.5.

14. The in-situ polymerized blend of claim 13, wherein (2) said polyether polyol has an average functionality of about 3.

15. The in-situ polymerized blend produced by the process of claim 1.

16. The in-situ polymerized blend of claim 15, wherein the overall equivalent weight is from about 450 to about 700 and the average functionality is from about 2.2 to about 2.8.

17. The in-situ polymerized blend of claim 15, wherein the weight ratio of propylene oxide to ethylene oxide in the epoxide which is continuing to be fed in step C) is varied from the actual weight ratio of propylene oxide to ethylene oxide in the epoxide which is fed into the reaction vessel in step B) in that a higher average ratio of ethylene oxide to propylene oxide is present in step C).

18. The in-situ polymerized blend of claim 15, wherein the weight ratio of propylene oxide to ethylene oxide in the epoxide which is continuing to be fed in step D) is varied from the actual weight ratio of propylene oxide to ethylene oxide in the epoxide which is fed into the reaction vessel in step B) in that a higher average ratio of ethylene oxide to propylene is present in step D).

19. The in-situ polymerized blend of claim 15, wherein the weight ratio of propylene oxide to ethylene oxide in the epoxide composition which is continuing to be fed in step D) is varied from the actual weight ratio of propylene oxide to ethylene oxide in the epoxide composition fed into the reaction vessel in step C) in that a higher average ratio of ethylene oxide to propylene oxide is present in step D).

20. The in-situ polymerized blend of claim 15, wherein A)(1) the initial starter ($S_i$) has an equivalent weight of at least about 200.

21. The in-situ polymerized blend of claim 15, wherein B)(1) the epoxide comprises propylene oxide and ethylene oxide in a weight ratio of from 100:0 to 40:60.

22. The in-situ polymerized blend of claim 15, wherein the reaction between the epoxide mixture and the initial starter ($S_i$) in step C) continues until the equivalent weight of the polyether monol reaches a value between 2,000 and 4,000.

23. The in-situ polymerized blend of claim 15, wherein D)(1) the low molecular weight starter ($S_c$) has a functionality of about 3 and an equivalent weight of about 28 to about 100.

24. The in-situ polymerized blend of claim 23, wherein D)(1) the low molecular weight starter ($S_c$) comprises glycerine.

25. A process for the production of a viscoelastic polyurethane foam comprising reacting a polyisocyanate with an isocyanate-reactive mixture, in the presence of at least one blowing agent, a surfactant and one or more catalysts at an isocyanate index of about 90 to about 120, wherein the isocyanate-reactive mixture comprises at least 50% by weight, based on 100% by weight of the isocyanate-reactive mixture, of an in-situ formed blend of one or more polyether monols and one or more polyether polyols characterized by an average equivalent weight of from about 350 to about 750, and an average functionality of about 2 to about 4, wherein said in-situ formed blend comprises:

(1) from about 25 to 75% by weight, based on 100% by weight of (1) and (2), of a polyether monol having an equivalent weight of about 1,500 to about 6,000; and (2) from about 25 to 75% by weight, based on 100% by weight of (1) and (2), of a polyether polyol having an equivalent weight of about 200 to about 500, and an average functionality of about 2.0 to about 8.

* * * * *